(12) United States Patent
Suyama et al.

(10) Patent No.: US 8,827,312 B2
(45) Date of Patent: Sep. 9, 2014

(54) PRETENSIONER AND SEAT BELT APPARATUS

(71) Applicants: Yoji Suyama, Tokyo (JP); Hirokazu Naganuma, Tokyo (JP)

(72) Inventors: Yoji Suyama, Tokyo (JP); Hirokazu Naganuma, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/758,117

(22) Filed: Feb. 4, 2013

(65) Prior Publication Data

US 2013/0207371 A1   Aug. 15, 2013

(30) Foreign Application Priority Data

Feb. 13, 2012   (JP) ................. 2012-028922

(51) Int. Cl.
| | |
|---|---|
| *B60R 22/06* | (2006.01) |
| *B60R 22/34* | (2006.01) |
| *B60R 22/18* | (2006.01) |
| *B60R 22/195* | (2006.01) |

(52) U.S. Cl.
CPC ......... *B60R 22/34* (2013.01); *B60R 2022/1818* (2013.01); *B60R 22/1952* (2013.01); *B60R 22/1951* (2013.01)
USPC ......... 280/804; 280/801.1; 297/468; 297/482

(58) Field of Classification Search
USPC ........... 280/801.1, 801.2, 806, 804, 807, 808; 297/482, 483, 474, 468, 470; 242/371, 242/379.2, 382, 383
See application file for complete search history.

(56) References Cited

U.S. PATENT DOCUMENTS

| | | | | |
|---|---|---|---|---|
| 4,473,926 | A * | 10/1984 | Ono ............................... | 24/196 |
| 7,118,132 | B2 * | 10/2006 | Terasaki ....................... | 280/806 |
| 7,168,742 | B2 * | 1/2007 | Tomita ......................... | 280/806 |
| 7,631,899 | B2 * | 12/2009 | Nakayama et al. ........... | 280/805 |
| 7,862,081 | B2 * | 1/2011 | Thomas ........................ | 280/733 |
| 7,900,965 | B2 * | 3/2011 | Hata et al. ..................... | 280/806 |
| 2004/0212188 | A1 | 10/2004 | Terasaki | |
| 2006/0090312 | A1 * | 5/2006 | Ichida et al. .................... | 24/633 |
| 2006/0096069 | A1 * | 5/2006 | Hoffman ................... | 24/265 BC |
| 2006/0279077 | A1 * | 12/2006 | Nakano et al. ................ | 280/806 |
| 2007/0069515 | A1 * | 3/2007 | Sakata ........................... | 280/806 |
| 2010/0052303 | A1 | 3/2010 | Hata et al. | |

FOREIGN PATENT DOCUMENTS

| | | |
|---|---|---|
| JP | 2004-322737 | 11/2004 |
| JP | 2004-322739 | 11/2004 |
| JP | 2005-081883 | 3/2005 |
| JP | 2005-081884 | 3/2005 |
| JP | 2010-058703 | 3/2010 |

* cited by examiner

*Primary Examiner* — Faye M Fleming
*Assistant Examiner* — Darlene P Condra
(74) *Attorney, Agent, or Firm* — IPUSA, PLLC

(57) ABSTRACT

A pretensioner includes a member having a through-hole, a tubular cover, and an actuator configured to pull the member to pull a belt folded back through the through-hole, wherein the tubular cover has a mounting portion that is fixedly positioned on the member upon being put on the member.

8 Claims, 11 Drawing Sheets

PRETENSIONER AND SEAT BELT APPARATUS

BACKGROUND OF THE INVENTION

1. Field of the Invention

The disclosures herein relate to a pretensioner and a seat belt apparatus having the pretensioner.

2. Description of the Related Art

In the field of seat belt pretensioners, a cover structure configured to cover a connecting member such as a wire for connecting a seat belt to a pretensioner actuator is known to those skilled in the art (see Japanese Patent Application Publication No. 2004-322739, for example).

In the related-art configuration described above, a tubular cover cannot be secured in place unless the seat belt is first put through the cover before attaching the cover to its place. Because of this, the process of attaching the cover is cumbersome.

Accordingly, it may be desirable to provide a pretensioner and a seat belt apparatus having the pretensioner for which the process of attaching a cover is simplified.

SUMMARY OF THE INVENTION

It is a general object of the present invention to provide a pretensioner and a seat belt apparatus that substantially obviates one or more problems caused by the limitations and disadvantages of the related art.

According to an embodiment, a pretensioner includes a member having a through-hole, a tubular cover, and an actuator configured to pull the member to pull a belt folded back through the through-hole, wherein the tubular cover has a mounting portion that is fixedly positioned on the member upon being put on the member.

According to an embodiment, a seat belt apparatus includes a belt, a retractor configured to retract the belt, a tongue attached to the belt, a buckle to which the tongue is detachably attached, and a pretensioner, wherein the pretensioner includes a member having a through-hole through which the belt is folded back, a tubular cover, and an actuator configured to pull the member to pull the belt, wherein the tubular cover has a mounting portion that is fixedly positioned on the member upon being put on the member.

According to at least one embodiment, the process of attaching a cover is simplified.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

Figure 1:
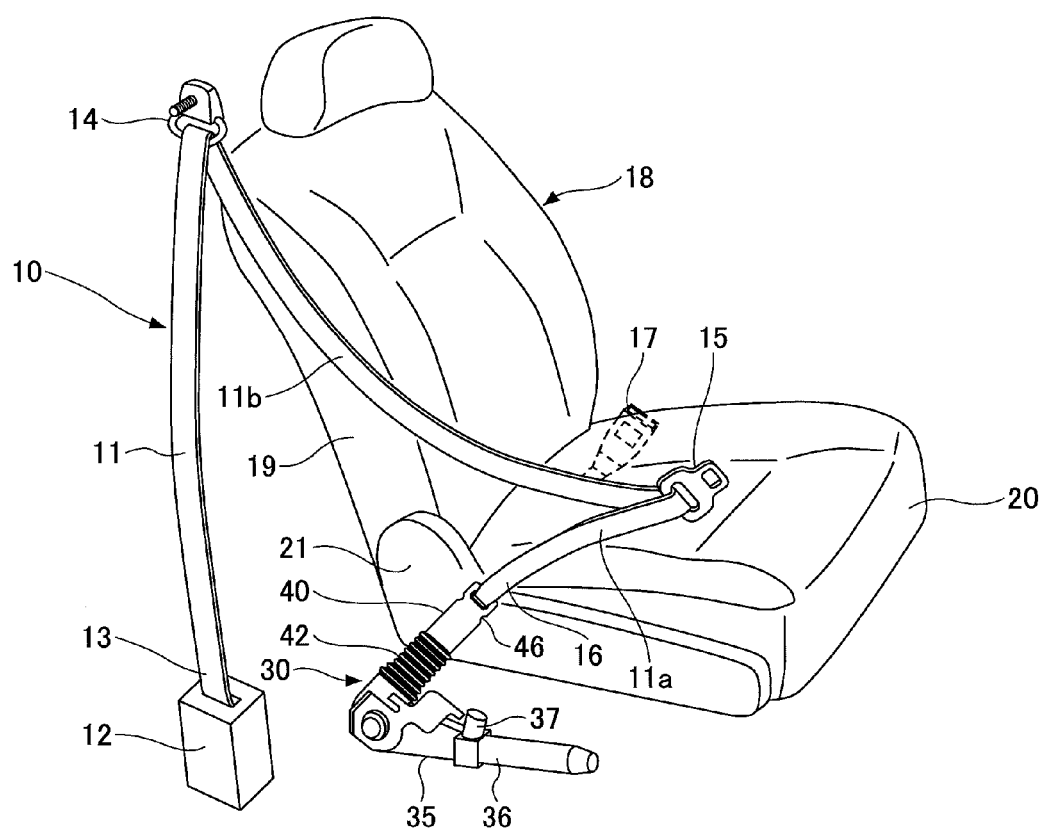
FIG. 1 is a drawing illustrating a seat belt apparatus according to an embodiment.

FIG. 1 is a drawing illustrating a seat belt apparatus according to an embodiment. In FIG. 1, a seat belt apparatus 10 as mounted in a vehicle is illustrated. The seat belt apparatus 10 includes a belt 11, a retractor 12, a tongue 15, a buckle 17, and a pretensioner 30.

The belt 11 is a strip-shaped member for holding a passenger in a seat 18. One end 13 of the belt 11 is connected to the retractor 12, and the other end 16 of the belt 11 is connected to the pretensioner 30. The belt 11 is also referred to as webbing.

The retractor 12 is a device that allows the belt 11 to be retracted or extracted. Upon detecting deceleration exceeding a predetermined value at the time of vehicle collision or the like, the retractor 12 restrains the belt 11 from being extracted. The retractor 12 may be fixedly mounted on the vehicle body at the side of a back 19 of the seat 18 (e.g., mounted on a lower portion of a pillar on which an anchor 14 is fixedly mounted).

The tongue 15 is a plate-shape member slidably attached to the belt 11 between the pretensioner 30 and the shoulder anchor 14.

The buckle 17 is a member to which the tongue 15 is detachably attached. The buckle 17 is fixedly mounted on the vehicle body on the opposite side of a seat bottom 20 from the retractor 12.

With the tongue 15 attached to the buckle 17, a shoulder belt portion 11b of the belt 11 holds the chest of a passenger in the seat 18, and a lap belt portion 11a of the belt 11 holds the waist portion of the passenger. The shoulder belt portion 11b is a portion of the belt 11 located between the shoulder anchor 14 and the tongue 15. The lap belt portion 11a is a portion of the belt 11 located between the tongue 15 and the pretensioner 30.

The pretensioner 30 is a lap pretensioner having a pretensioner actuator 35 that promptly retracts the lap belt portion 11a of the belt 11 upon detecting deceleration exceeding a predetermined value at the time of vehicle collision or the like, thereby tightening up any slack in the lap belt portion 11a relative to the passenger's waist portion. The pretensioner actuator 35 may typically be mounted on the vehicle body at a position close to a door at the side of the seat bottom 20. The pretensioner actuator 35 includes a cylinder 36 having a longitudinal direction thereof aligned with the front-back direction of the vehicle and a gas generator 37 to inject gas into the cylinder 36.

Figure 2:
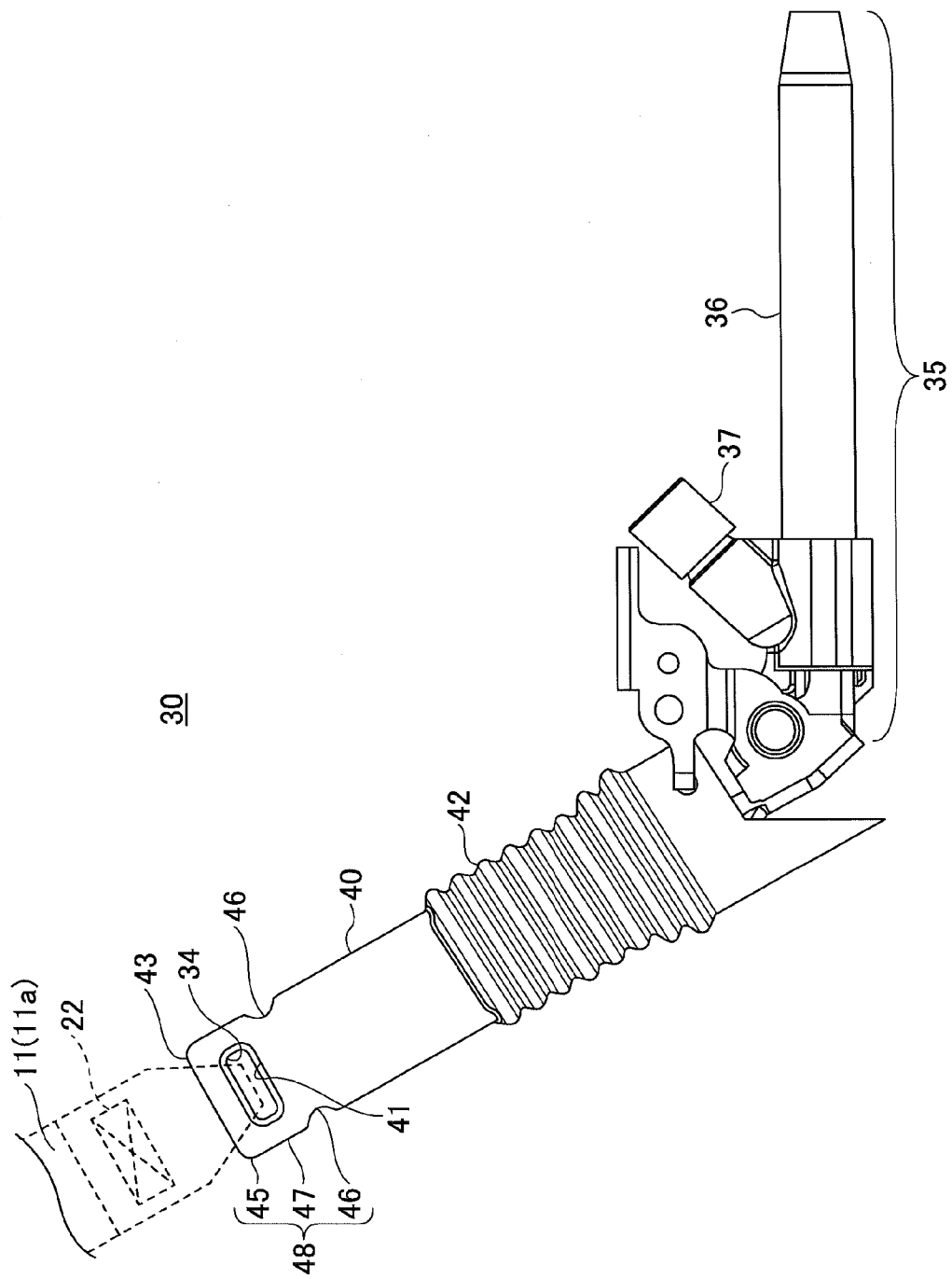
FIG. 2 is a front view of a pretensioner according to an embodiment.
Figure 3:
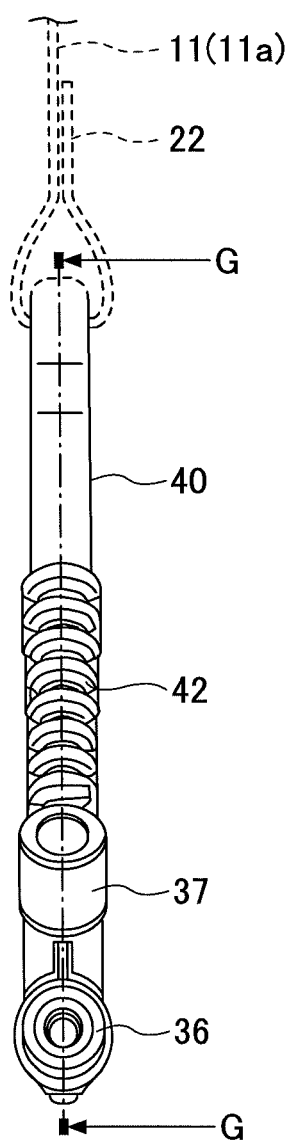
FIG. 3 is a lateral view of the pretensioner.
Figure 4A:
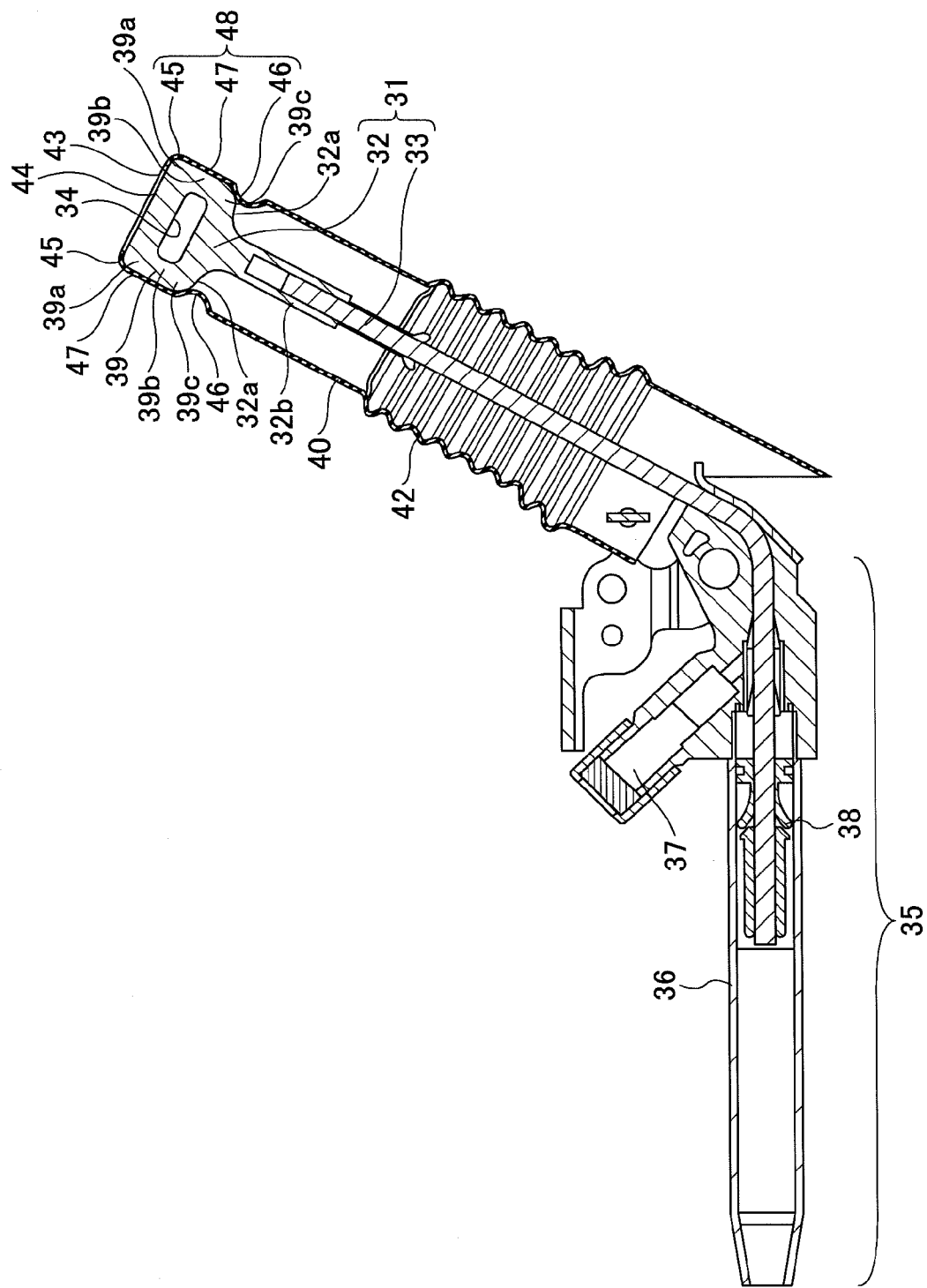
FIG. 4A is a cross-sectional view of the pretensioner taken along the line G-G illustrated in FIG. 3.

FIG. 2 is a front view of the pretensioner 30. FIG. 3 is a lateral view of the pretensioner 30. FIG. 4A is a cross-sectional view of the pretensioner 30 taken along the line G-G illustrated in FIG. 3.

In FIG. 4A, the gas generator 37 injects gas into the cylinder 36 upon detection of deceleration exceeding a predetermined value. As a result of the gas injection into the cylinder 36, a piston 38 moves in the cylinder 36. The piston 38 is connected to the lap belt portion 11a of the belt 11 via a connecting member 31. As a result of the movement of the piston 38 in the cylinder 36, the lap belt portion 11a is pulled by the connecting member 31 toward the pretensioner actuator 35. This results in an increase in the force holding the passenger.

As illustrated in FIG. 4A, the connecting member 31 includes a ferrule 32, which is a member having a through-hole 34. The connecting member 31 further includes a wire 33 for providing a connection between the ferrule 32 and the piston 38.

The ferrule 32 is a plate-shape joint for connecting the lap belt portion 11a to the wire 33. The ferrule 32 is also referred to as a lap anchor. The ferrule 32 includes an annular portion 39, a narrowing portion 32a, and a connecting portion 32b. The annular portion 39 has a through-hole at the center thereof through which the lap belt portion 11a is passed and folded back. The narrowing portion 32a has a width thereof becoming narrower than the width of the annular portion 39. The connecting portion 32b connects the narrowed end of the narrowing portion 32a to the wire 33.

Figure 4B:
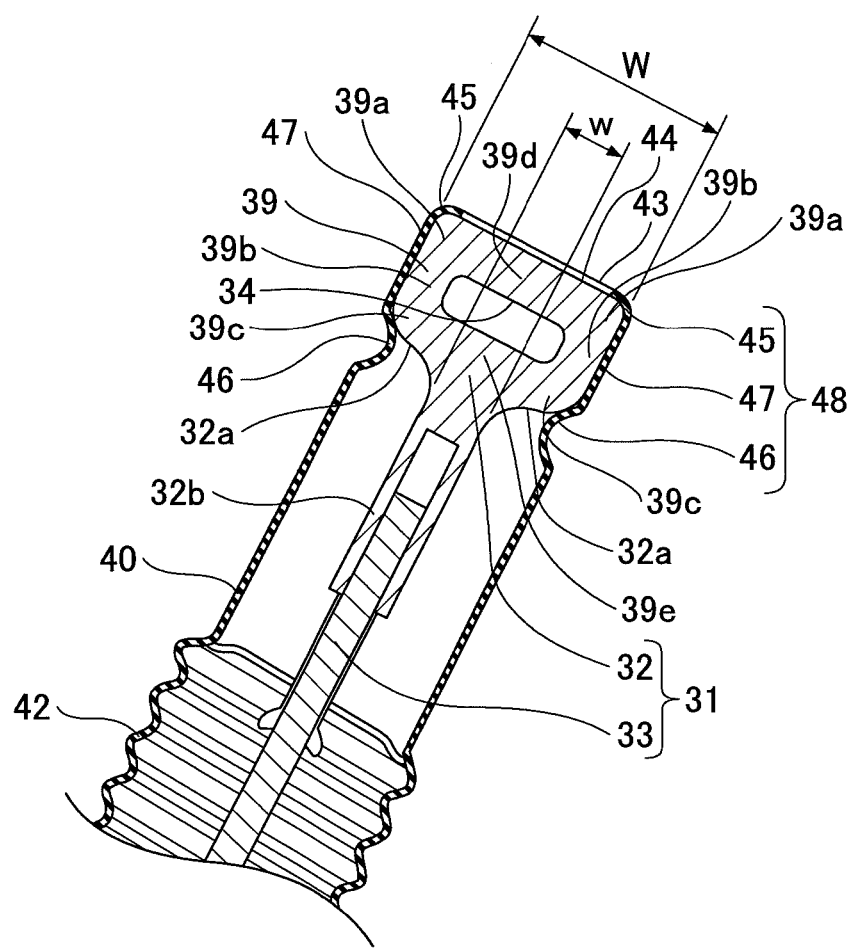
FIG. 4B is a partial enlarged view of the configuration illustrated in FIG. 4A.

FIG. 4B is a partial enlarged view of the configuration illustrated in FIG. 4A. The annular portion 39 has a frame shape that surrounds the through-hole 34. The annular portion 39 includes an upper side portion 39d, upper corner portions 39a, a lower side portion 39e, lower corner portions 39c, and lateral side portions 39b. The upper side portion 39d is situated on an upper side of the through-hole 34. The upper corner portions 39a are situated at opposite ends of the upper side portion 39d. The lower side portion 39e is situated on a lower side of the through-hole 34. The lower corner portions 39c are situated at both ends of the lower side portion 39e. The lateral side portions 39b are situated between the upper corner portions 39a and the lower corner portions 39c, respectively.

The narrowing portion 32a is formed as a structure seamlessly continuing from the lower corner portions 39c of the annular portion 39 to the connecting portion 32b such that the width thereof gradually narrows to form smooth curves. The width of the narrowing portion 32a becomes thinner toward the connecting portion 32b. The rate at which the width of the narrowing portion 32a narrows decreases toward the connecting portion 32b. The narrowing portion 32a may include a portion at which the width thereof widens after some narrowing, or may have no such a portion. The narrowing portion 32a illustrated in FIG. 4B does not have such a portion at which the width thereof widens after some narrowing.

The connecting portion 32b extends toward the pretensioner actuator 35 from the narrowing portion 32a at the position at which the width of the narrowing portion 32a is the narrowest. The width w of the connecting portion 32b or the portion at which the width of the narrowing portion 32a is the narrowest is narrower than the width W of the annular portion 39. The ratio of w to W may be 1 to through 1 to 3.5, and may be selected as appropriate.

The connecting member 31 is covered with a boot 40 so that the connecting member 31 is not directly visible. Part or all of the boot 40 may be a tubular (or sleeve-shaped) cover. The cover may preferably be a rectangular sleeve shape, or may be some other shape. With the boot 40 covering the connecting member 31, the connecting member 31 is hidden inside the boot 40, which serves to provide a better appearance. Further, such a configuration also serves to prevent the generation of an unfamiliar sound that may occur when the connecting member 31 comes in contact with other vehicle interior parts. The boot 40 may be formed by blow molding.

The boot 40 includes a mounting portion 48 that is fixedly positioned on the ferrule 32 upon the boot 40 being put on the ferrule 32 of the connecting member 31. The mounting portion 48 is configured to fit the outline shape of the annular portion 39 of the ferrule 32. The detail of the shape and the like of the mounting portion 48 will be described later. The fact that the boot 40 has the mounting portion 48 ensures that a worker can fixedly position the boot 40 on the ferrule 32 through the function of the mounting portion 48 by simply putting the boot 40 on the ferrule 32. A worker or an assembling apparatus may be able to fixedly position the boot 40 on the ferrule 32 before passing the lap belt portion 11a through the through-hole 34 of the ferrule 32 via openings 41 (see FIG. 2) formed in the boot 40. Consequently, the process of attaching the boot 40 is simplified.

Moreover, as illustrated in FIG. 4A, the boot 40 has an accordion portion 42 below the mounting portion 48. When the wire 33 of the connecting member 31 is retracted by the pretensioner actuator 35, the accordion portion 42 may be compressed to allow the wire 33 to be smoothly retracted by the pretensioner actuator 35 even though the mounting portion 48 of the boot 40 is fixedly positioned on the ferrule 32.

The mounting portion 48 is formed at the upper portion of the boot 40 such that the mounting portion 48 is engaged with, or fits into, the narrowing portion 32a of the ferrule 32 upon the boot 40 being put on the ferrule 32 from the upper side of the ferrule 32. With this arrangement, the boot 40 may be easily engaged with the ferrule 32 to ensure fixed positioning. The boot 40 may be formed of resin material. A rubber member may be an appropriate material for allowing the boot 40 to engage with the ferrule 32 for fixed positioning. Olefinic thermoplastic elastomer, for example, may be used as a preferred material. A proper thickness of the boot 40 for the boot 40 to engage with the ferrule 32 for fixed positioning may be 0.5 mm to 2.5 mm, and may more preferably be 0.8 mm to 2.0 mm.

[First Embodiment of Tubular Cover]

Figure 5:
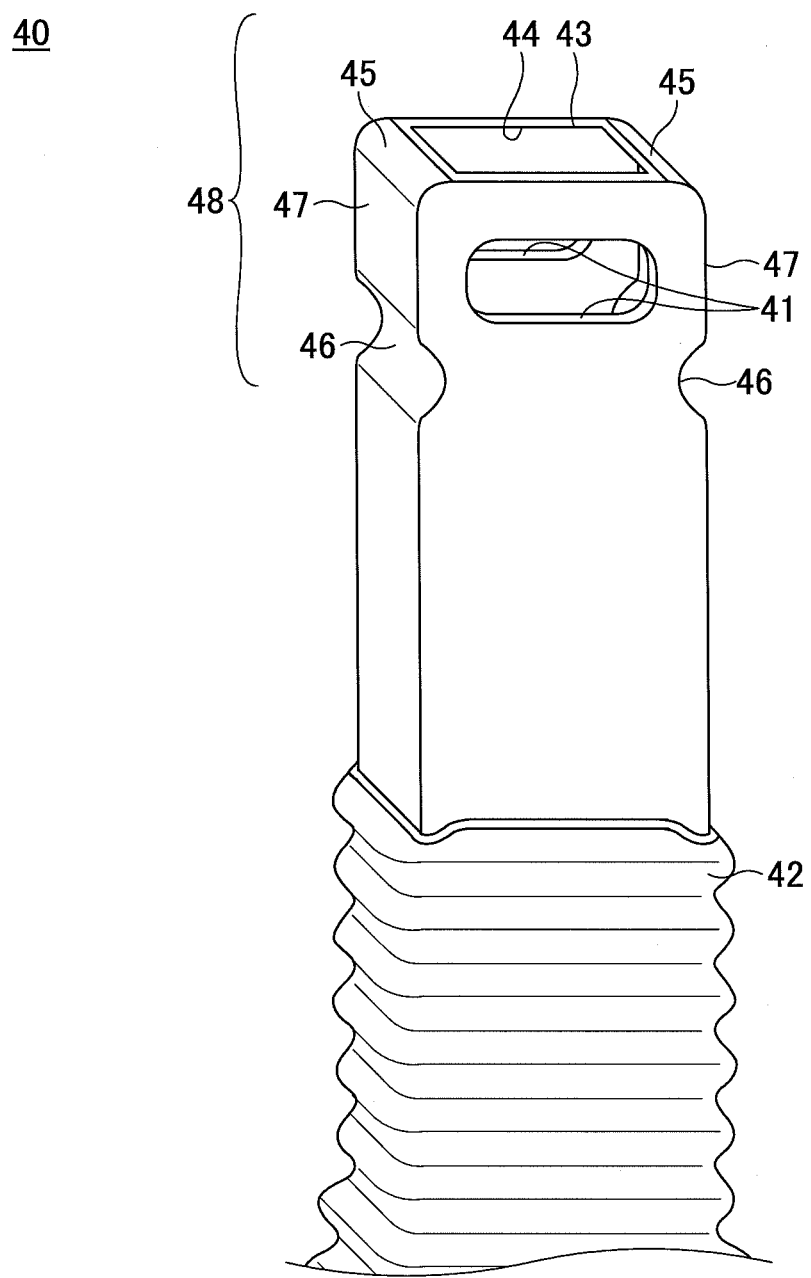
FIG. 5 is an oblique perspective view of a boot according to a first embodiment of a tubular cover.

FIG. 5 is an oblique perspective view of the boot 40 according to a first embodiment of a tubular cover. Illustration of the lower end of the boot 40 is omitted. The mounting portion 48 is formed at the upper end portion of the boot 40. The mounting portion 48 includes upper surface portions 45, lateral surface portions 47, and indented portions 46.

A pair of the upper surface portions 45 is formed at the top face 43 of the boot 40 in such a fashion to extend from the lateral surfaces of the boot 40. The provision of the upper surface portions 45 at the top face 43 ensures that the action by a worker or assembling apparatus of putting the boot on the ferrule 32 from the upper side of the ferrule 32 results in the top end portion of the ferrule 32 coming in contact with the upper surface portions 45 even when an opening 44 is formed in the top face 43 of the boot 40. With this arrangement, the ferrule 32 is prevented from protruding through the opening 44.

It may be noted that the opening 44 may not be provided in the tubular cover (i.e., boot 40). In the disclosures herein, the term "tubular" is used to describe the cover irrespective of whether the opening 44 is provided at one end of the "tubular" cover. With or without the opening 44, the tubular cover (boot 40) may have at least one opening (e.g., openings 41) near one end thereof to allow passage of the seat belt 11, and may also have an opening at the other end to allow the wire 33 to come out.

As illustrated in FIG. 4B, the inner surfaces of the upper surface portions 45 are formed in such a shape as to come in direct contact with the surfaces of the upper corner portions 39a of the annular portion 39 of the ferrule 32 when the mounting portion 48 is engaged with the narrowing portion 32a. The use of such a shape improves the effect of suppressing positional displacement of the boot 40 with respect to the ferrule 32.

The lateral surface portions 47 are formed at the opposite side faces of the boot 40, respectively. The inner surfaces of the lateral surface portions 47 are formed in such a shape as to come in direct contact with the surfaces of the lateral side portions 39b of the annular portion 39 when the mounting portion 48 is engaged with the narrowing portion 32a. The use of such a shape improves the effect of suppressing positional displacement of the boot 40 with respect to the ferrule 32.

The mounting portion 48 is formed such that the distance between the lateral surface portions 47 is the same as or slightly narrower than the width W of the annular portion 39. This arrangement serves to cause the mounting portion 48 of the boot 40 to be more securely positioned on the ferrule 32, thereby improving the effect of suppressing positional displacement of the boot 40 with respect to the ferrule 32. It may be noted that the mounting portion 48 may be formed such that the distance between the lateral surface portions 47 is wider than the width W of the annular portion 39 as long as the positional displacement of the boot 40 with respect to 32 is kept within a tolerable range.

The indented portions 46 are formed at the opposite side faces of the boot 40, respectively. The indented portions 46 functions as a holding part to keep the mounting portion 48 in the engaged position with the narrowing portion 32a. The provision of the indented portions 46 makes it more difficult for the mounting portion 48 to disengage from the narrowing portion 32a. Even when the boot is pulled upwards, the boot 40 is not easily removed from the ferrule 32. Further, the inner surfaces of the indented portions 46 are formed in such a shape as to come in direct contact with the narrowing portion 32a extending from the lower corner portions 39c of the annular portion 39 when the mounting portion 48 is engaged with the narrowing portion 32a. With this arrangement, the effect of suppressing positional displacement of the boot 40 with respect to the ferrule 32 is improved. The indented portions 46 are formed by indenting the lateral faces of the boot 40 inwardly. With this arrangement, the effect of keeping the mounting portion 48 in the engaged position with the narrowing portion 32a is improved.

As illustrated in FIG. 2 and FIG. 5, the boot 40 has the openings 41 through which the belt is passed when the belt 11 is put through the through-hole 34 of the annular portion 39 and folded back. The openings 41 are formed in the lateral faces of the boot 40 that are different from the lateral faces in which the indented portions 46 are formed. The indented portions 46 is indented and arranged in the direction perpendicular to both the direction in which the openings 41 face and the direction in which the ferrule 32 is pulled The direction in which the openings 41 face is the direction normal to the planes in which the openings 41 exist. The direction in which the ferrule 32 is pulled is the longitudinal direction of the boot 40.

As illustrated in FIG. 2, the mounting portion 48 has the indented portions 46 such that the position of the openings 41 coincide with the position of the through-hole 34 when the boot 40 is put on the ferrule 32. With this arrangement, putting the boot 40 on the ferrule 32 results in a belt insertion pass being created through one of the openings 41, the through-hole 34, and the other one of the openings 41. A worker or assembling apparatus may put one end of the belt 11 through one of the openings 41 and then through the through-hole 34, and pull the end out through the other one of the openings 41, thereby easily passing the end of the belt 11 through the through-hole 34 and the openings 41.

The end of the belt 11 having passed through the through-hole 34 and the openings 41 is folded back toward the direction away from the pretensioner actuator 35. The end of the belt 11 that is folded back is sawed with a string 22 on a portion of the belt 11 that is not passed through the through-hole 34 and the openings 41. With this, the task of attaching the belt 11 is completed.

Figure 6:
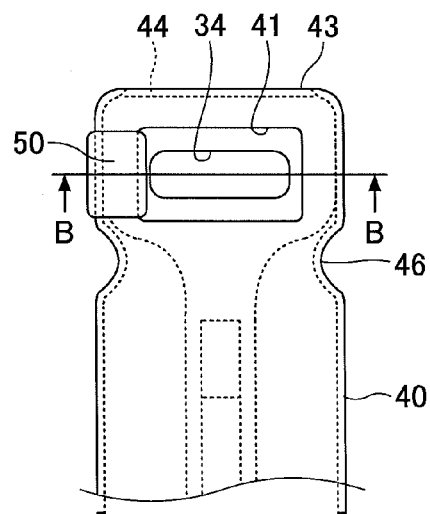
FIG. 6 is a drawing illustrating an unwoven cloth attached to the boot.

FIG. 6 is a drawing illustrating an unwoven cloth 50 attached to the boot 40. The unwoven cloth 50 is a buffer material to prevent the boot 40 from scratching a side cover 21 of the seat bottom 20 (see FIG. 1). Further, the unwoven cloth 50 serves to prevent rasping sound from being generated by the boot 40 rubbing against the side cover 21. The unwoven cloth 50 may be other buffer materials such as woven cloth or sponge material.

Figure 7:
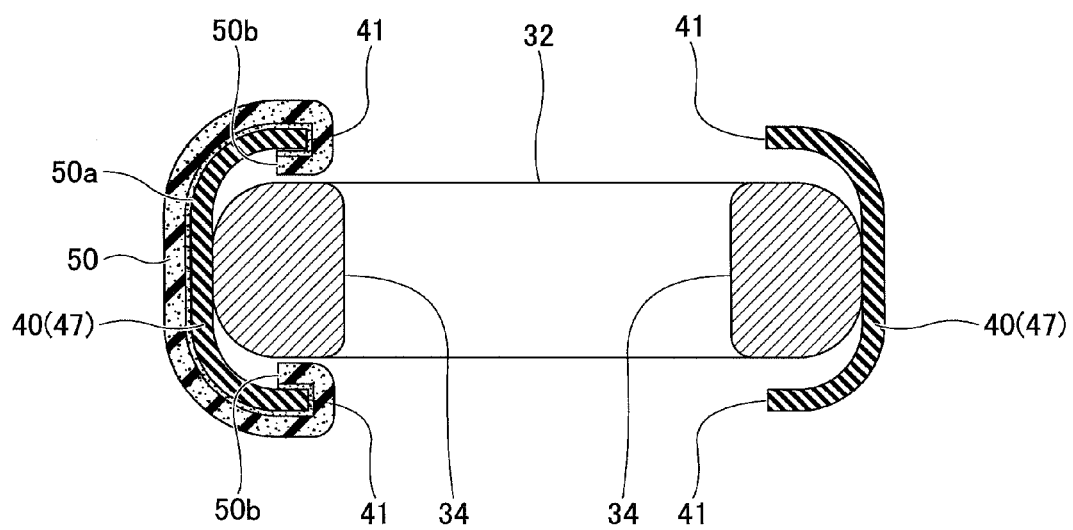
FIG. 7 is a cross-sectional view taken along the line B-B illustrated in FIG. 6.

FIG. 7 is a cross-sectional view taken along the line B-B illustrated in FIG. 6. An adhesive tape 50a is provided in advance on one surface of the unwoven cloth 50. The adhesive tape 50a is a tape that has adhesiveness, and may be replaced with another adhesive member. Adhesive agent may be applied directly to the unwoven cloth to attach the unwoven cloth 50 to the lateral surface portion 47. The unwoven cloth 50 is attached in advance to the lateral surface portion 47 through the adhesive tape 50a before the boot 40 is put on the ferrule 32. Ends of the unwoven cloth 50 are folded back at the edges of the openings 41 toward inside the boot 40. This arrangement prevents the unwoven cloth 50 from being peeled off at its ends 50b upon being rubbed against the side cover 21 of the seat bottom 20. In FIG. 7, the unwoven cloth 50 is attached to only one of the lateral surface portions 47. Alternatively, the unwoven cloths 50 may be attached to both of the lateral surface portions 47.

The unwoven cloth 50 may be attached in advance to the top face 43 of the boot 40 (see FIG. 6), and the ends 50b of the unwoven cloth 50 may be folded back at the upper edges of the openings 41 toward inside the boot 40. This arrangement allows the unwoven cloth 50 to cover the opening 44 formed in the top face 43 so that the interior of the boot 40 is not visible through the opening 44. Moreover, the action of putting the boot 40 on the ferrule 32 from the upper side of the ferrule 32 results in the top end portion of the ferrule 32 coming in contact with the unwoven cloth 50 that is adhered to the top face 43 of the boot 40. With this arrangement, the ferrule 32 is prevented from protruding through the opening 44.

[Second Embodiment of Tubular Cover]

Figure 8:
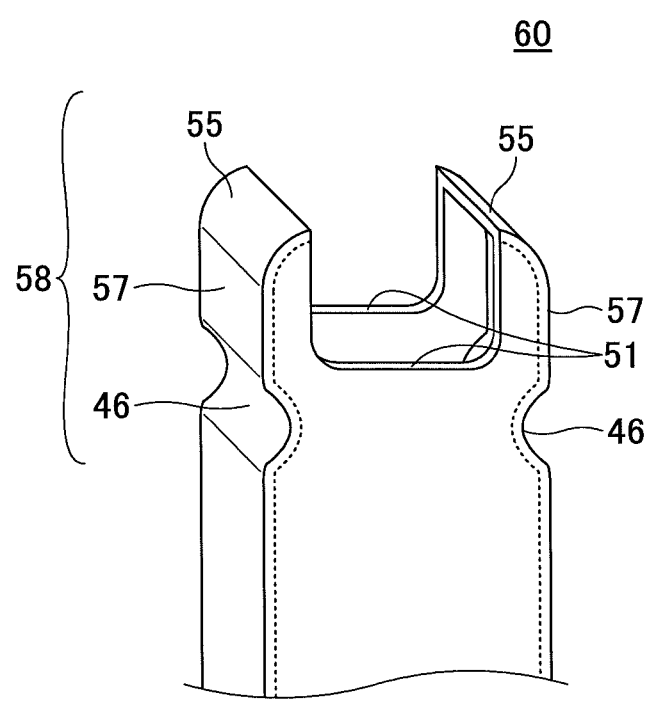
FIG. 8 is an oblique perspective view of a boot according to a second embodiment of a tubular cover.

FIG. 8 is an oblique perspective view of a boot 60 according to a second embodiment of a tubular cover. A description will be omitted with regard to the same aspects as those of the previously described boot.

The boot 60 includes a mounting portion 58 that is fixedly positioned on the ferrule 32 upon the boot 60 being put on the ferrule 32 of the connecting member 31. The mounting portion 58 is formed at the upper end portion of the boot 60. The mounting portion 58 includes upper surface portions 55, lateral surface portions 57, and indented portions 46. The boot 60 has openings 51 through which the belt 11 is passed when the belt 11 is put through the through-hole 34 of the ferrule 32 and folded back. The openings 51 are formed by removing the top end face of the boot 60 as an open section facing upward. The provision of the openings 51 prevents an increase in the volume of the portion at which the belt 11 is passed through the through-hole 34 of the ferrule 32 and folded back.

[Third Embodiment of Tubular Cover]

Figure 9A:
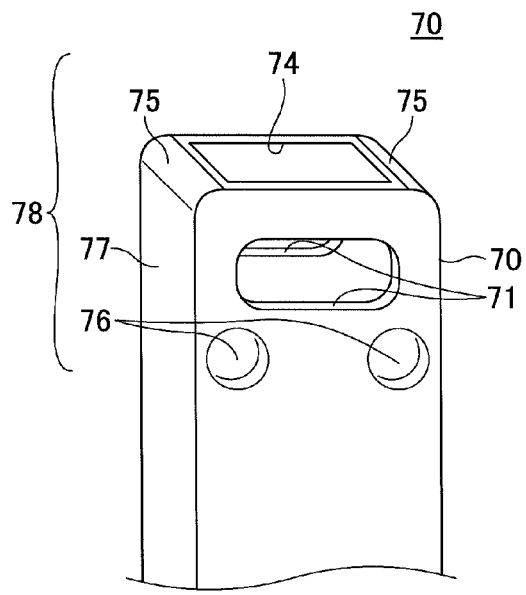
FIGS. 9A through 9C are drawings illustrating a boot according to a third embodiment of a tubular cover.
Figure 9B:
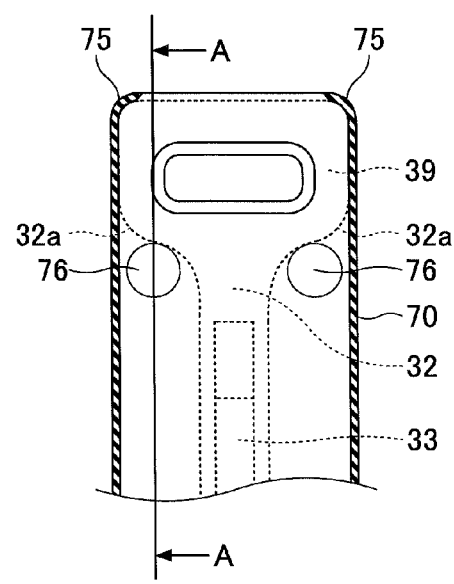
Figure 9C:
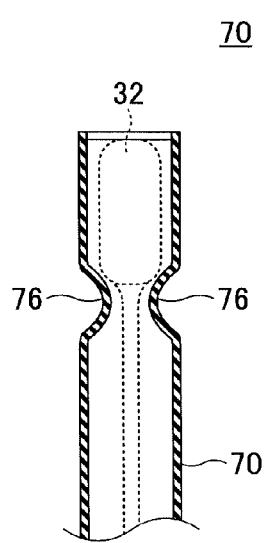

FIGS. 9A through 9C are drawings illustrating a boot 70 according to a third embodiment of a tubular cover. FIG. 9A is an oblique perspective view of the boot 70. FIG. 9B is a cross-sectional view of the boot 70. FIG. 9C is a cross-sectional view of the boot 70 taken along the like A-A illustrated in FIG. 9B. A description will be omitted with regard to the same aspects as those of the previously described boot.

The boot 70 includes a mounting portion 78 that is fixedly positioned on the ferrule 32 upon the boot 70 being put on the ferrule 32 of the connecting member 31. The mounting portion 78 is formed at the upper end portion of the boot 70. The mounting portion 78 includes upper surface portions 75, lateral surface portions 77, and circular indented portions 76. The boot 70 has openings 71 through which the belt 11 is passed when the belt 11 is put through the through-hole 34 of the ferrule 32 and folded back. The indented portions 76 are formed on the lateral faces of the boot 70 as inward indentations. The indented portions 76 are indented in the direction normal to the planes in which the openings 71 exist, and are formed in the same lateral faces that have the openings 71. Namely, the indented portions 76 are indented in a direction parallel to a direction in which the openings 71 face. Further, the indented portions 76 are formed such that their upper ends come in contact with the narrowing portion 32a. In FIGS. 9A through 9C, two pairs of indented portions 76 are formed in the opposite lateral faces of the boot 70 such as to face each other. With the provision of such indented portions 76, the effect of keeping the mounting portion 78 in the engaged position with the narrowing portion 32a is improved.

[Fourth Embodiment of Tubular Cover]

Figure 10B:
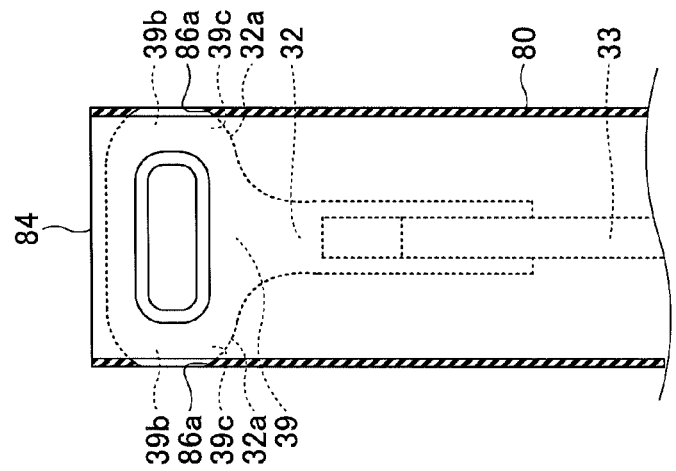
FIGS. 10A and 10B are drawings illustrating a boot according to a fourth embodiment of a tubular cover.
Figure 10A:
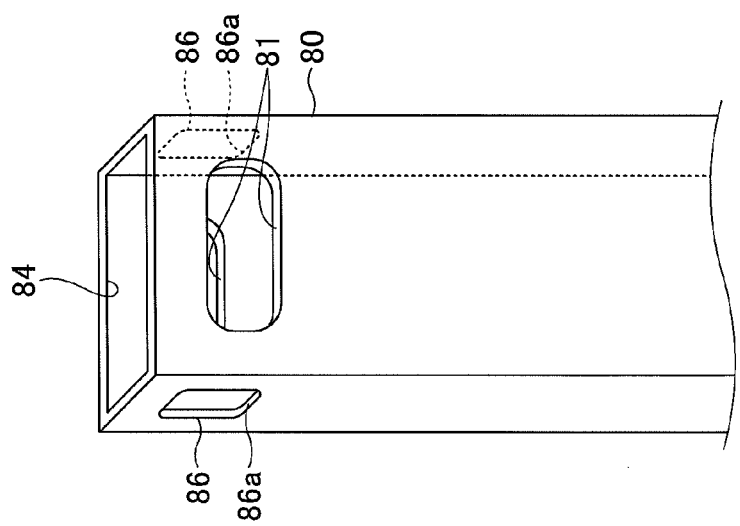

FIGS. 10A and 10B are drawings illustrating a boot 80 according to a fourth embodiment of a tubular cover. FIG. 10A is an oblique perspective view of the boot 80. FIG. 10B is a cross-sectional view of the boot 80. A description will be omitted with regard to the same aspects as those of the previously described boot.

The boot 80 includes a pair of positioning holes 86 that is fixedly positioned on the ferrule 32 upon the boot 80 being put on the ferrule 32 of the connecting member 31. The boot 80 has openings 81 through which the belt 11 is passed when the belt 11 is put through the through-hole 34 of the ferrule and folded back. The positioning holes 86 are arranged in the direction perpendicular to both the longitudinal direction of the boot 80 and the direction normal to the planes in which the openings 81 exist. The positioning holes 86 are formed in the lateral faces of the boot 80 to connect the interior space to the outside When the boot 80 is put on the ferrule 32 from the upper side of the ferrule 32, the positioning holes 86 engage with the annular portion of the ferrule 32, thereby fixedly positioning the boot 80 on the ferrule 32. The positioning holes 86 may engage with the lateral side portions 39b of the annular portion 39, for example, to fixedly position the boot 80 on the ferrule 32. Alternatively, the positioning holes 86 may engage with the lower corner portions 39c of the annular portion 39 to fixedly position the boot 80 on the ferrule 32. With lower sides 86a of the positioning holes 86 being engaged with the narrowing portion 32a of the annular portion 39, the boot 80 is unlikely to disengage from the ferrule 32. The lateral side portions 39b may not project from the lateral faces of the boot 80 as illustrated in FIG. 10B when the positioning holes 86 are engaged with the lateral side portions 39b, or may alternatively project. Moreover, a buffer material such as the unwoven cloth 50 may be attached to the boot 80 similarly to the manner illustrated in FIG. 6. This arrangement ensures that the lateral side portions 39b are not exposed through the positioning holes 86, thereby providing a better appearance despite the fact that the positioning holes 86 are formed.

Although the present invention has been described with reference to preferred embodiments, the present invention is not limited to these embodiments. Any one of these embodiments may be modified in various manners such as to be combined with part or all of the other embodiments, or partly replaced with part of the other embodiments.

Figure 11:
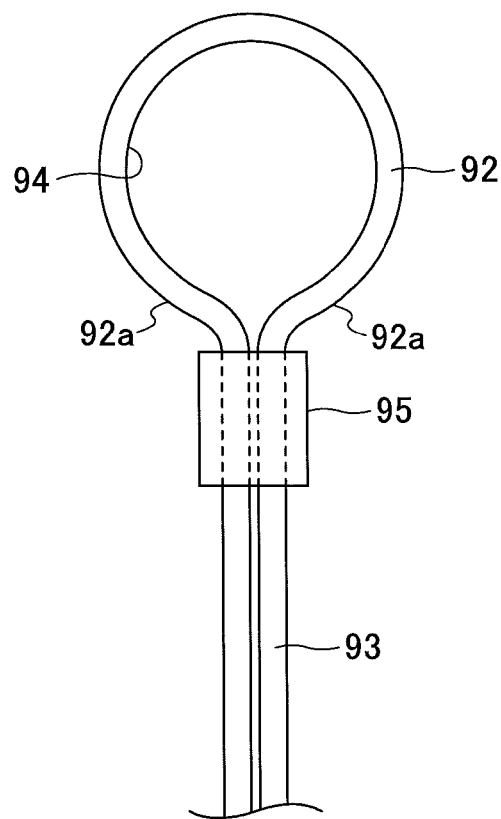
FIG. 11 is a drawing illustrating an example of an annular portion formed of a wire.

For example, a ferrule has been used in the above-described embodiments as a member on which the mounting portion of a cover is fixedly positioned. Such a member is not limited to a ferrule. A connecting member 91 that does not have a ferrule as illustrated in FIG. 11 may be used. The connecting member 91 is a component for connecting the lap belt portion 11a of the belt 11 to the piston 38 of the pretensioner actuator 35 similarly to the connecting member 31 illustrated in FIG. 4A. The connecting member 91 is made by swaging a looped wire 93 with a swaging part 95. The connecting member 91 formed in such a manner includes an annular portion 92 and a narrowing portion 92a. The annular portion 92 forms a through-hole 94 through which the lap belt portion 11a is folded back. The narrowing portion 92a has a width thereof narrower than the width of the annular portion 92. When a tubular cover such as a boot described heretofore is put on the connecting member 91, a mounting portion of the tubular cover engages with the narrowing portion 92a for fixed positioning. Consequently, the cover is fixedly positioned on the annular portion 92.

The present application is based on Japanese priority application No. 2012-028922 filed on Feb. 13, 2012, with the Japanese Patent Office, the entire contents of which are hereby incorporated by reference.

What is claimed is:

1. A pretensioner, comprising:
   a member having a through-hole, the member including an annular portion having the through-hole formed therein;
   a tubular cover; and
   an actuator configured to pull the member to pull a belt folded back through the through-hole,
   wherein the tubular cover has a mounting portion that is fixedly positioned on the member upon being put on the member, and the mounting portion of the tubular cover has at least one opening which allows passage of the belt,
   wherein the mounting portion of the tubular cover around the at least one opening encloses the annular portion around the through-hole,
   wherein the member includes a narrowing portion having a width thereof narrower than a width of the annular portion, and wherein the mounting portion is fixedly positioned upon being engaged with the narrowing portion.

2. The pretensioner as claimed in claim 1, wherein the mounting portion is fixedly positioned such that the at least one opening is aligned with the through-hole.

3. The pretensioner as claimed in claim 2, wherein the mounting portion comprises an indented portion formed in the cover.

4. The pretensioner as claimed in claim 3, wherein the indented portion is indented in a direction perpendicular to a direction in which the at least one opening faces.

5. The pretensioner as claimed in claim 3, wherein the indented portion is indented in a direction parallel to a direction in which the at least one opening faces.

6. The pretensioner as claimed in claim 2, wherein the mounting portion comprises a hole formed in the cover.

7. A pretensioner, comprising:
   a member having a through-hole;
   a tubular cover; and an actuator configured to pull the member to pull a belt folded back through the through-hole, wherein the tubular cover has a mounting portion that is fixedly positioned on the member upon being put on the member, wherein the member includes an annular portion having the through-hole formed therein, and includes a narrowing portion having a width thereof narrower than a width of the annular portion, and wherein the mounting portion is fixedly positioned upon being engaged with the narrowing portion, wherein the cover includes openings providing a path for the belt to be folded back through the through-hole, and the mounting portion is fixedly positioned such that the openings are aligned with the through-hole, wherein ends of a buffer member attached to the cover are folded back through the openings toward inside the cover.

8. A seat belt apparatus, comprising:

a belt;

a retractor configured to retract the belt;

a tongue attached to the belt;

a buckle to which the tongue is detachably attached; and a pretensioner, wherein the pretensioner includes:

a member including an annular portion, the annular portion having a through-hole formed therein through which the belt is folded back;

a tubular cover; and an actuator configured to pull the member to pull the belt, wherein the tubular cover has a mounting portion that is fixedly positioned on the member upon being put on the member, and the mounting portion of the tubular cover has at least one opening which allows passage of the belt, wherein the mounting portion of the tubular cover around the at least one opening encloses the annular portion around the through-hole, wherein the member includes a narrowing portion having a width thereof narrower than a width of the annular portion, and wherein the mounting portion is fixedly positioned upon being engaged with the narrowing portion.

* * * * *